(12) United States Patent
Tsai et al.

(10) Patent No.: US 6,751,754 B2
(45) Date of Patent: Jun. 15, 2004

(54) SINGLE STEP DEBUG CARD USING THE PCI INTERFACE

(75) Inventors: Chun-Nan Tsai, Hsin-Chu (TW); Hou-Li Chu, Hsin-Chu (TW); Chih-Hao Feng, Hsin-Chu Hsien (TW)

(73) Assignee: Mitac International Corp., Hsinchu (TW)

( * ) Notice: Subject to any disclaimer, the term of this patent is extended or adjusted under 35 U.S.C. 154(b) by 504 days.

(21) Appl. No.: 09/805,574

(22) Filed: Mar. 14, 2001

(65) Prior Publication Data

US 2001/0027543 A1 Oct. 4, 2001

(30) Foreign Application Priority Data

Mar. 29, 2000 (TW) .................................. 89105771 A

(51) Int. Cl.[7] .............................. G06F 11/00; H04L 1/22
(52) U.S. Cl. .......................................... 714/43; 710/15
(58) Field of Search ........................... 714/43, 44, 47, 714/56, 48, 45, 27; 710/15, 8, 5, 62

(56) References Cited

U.S. PATENT DOCUMENTS 5,864,688 A * 1/1999 Santos et al. ............... 710/306
6,247,087 B1 * 6/2001 Riley et al. ................. 710/309
6,526,525 B1 * 2/2003 Chang ......................... 714/40

* cited by examiner

Primary Examiner—Nadeem Iqbal
(74) Attorney, Agent, or Firm—Rabin & Berdo, P.C.

(57) ABSTRACT

This specification discloses a single step debug card using the PCI bus, which keeps the FRAME# of the PCI bus at a low voltage; latches and displays through an LED the address and command of the PCI bus cycle; keeps the control signal of read only memory and the IRDY# ready signal and TRDY# ready signal on the PCI bus at a low voltage, latches and displays through an LED the data and byte enable of the PCI bus cycle; outputs a device selection signal from a target device when the target device is detected; intercepts the PCI bus cycle when the device selection signal is kept at a low voltage and both the IRDY# ready signal and the TRDY# ready signal are kept at a low voltage; enables the PCI host to provide a retry function when the target device cannot respond a TRDY# ready signal before the PCI bus cycle ends so as to achieve the function of single step interruption debugging.

10 Claims, 5 Drawing Sheets

SINGLE STEP DEBUG CARD USING THE PCI INTERFACE

BACKGROUND OF THE INVENTION

1. Field of Invention

The present invention relates to a single step debug card and, more particularly, to a single step debug card that utilizes the peripheral component interconnect (PCI) interface.

2. Related Art

FIG. 1 depicts a structural block diagram of a computer system commonly used nowadays. Obviously, the CPU 10 connects to a north bridge (NB, a chipset) 30 through a CPU bus 20. Other than connecting to memory 40 (which can be SDRAM, EDORAM, etc), the NB 30 also connects to an AGP VGA card 60 through an AGP bus 50. The NB 30 also connects to a south bridge (SB, also a chipset) 80 through a PCI bus 70 for transferring data and information. Other than connecting with the hard drive (HD) 90, the CD-ROM 100, the universal serial bus (USB) 110, input devices (such as the mouse and keyboard) 120 for retrieving or inputting data, the SB 80 also connects to the basic input/output system (BIOS) 150 and the audio device (such as a sound blaster card) 160 through an XD bus 130 and an ISA bus 140, respectively.

The conventional single step interruption debug card is applied to an industry standard architecture (ISA) bus for terminating the IOCHRDY signal of the ISA bus cycle and forcing it to be at the low voltage. The object is to elongate the bus cycle so as to inspect the related address and the state of the data line bus.

On the PCI bus, the access of the CPU to the conventional BIOS has to first transfer the access cycle from the PCI bus to the ISA bus through a PCI/ISA bridge. After the BIOS data is read out by ROM on the ISA bus, the data are sent from the ISA bus back to the PCI bus through the PCI/ISA bridge. Since the BIOS data access cycle on the PCI bus has to be responded through and by the PCI/ISA bridge, that is, the relevant PCI cycle control signals such as DEVSEL# and TRDY# have to be generated by the PCI/ISA bridge, it is impossible to suspend the bus cycle by simply keep the signals that terminate the PCI cycle (such as TRDY#) at the high voltage.

The debug cards for the PCI bus available on the market have to rely on the assistance of the ISA bus interruption debug cards so as to force the IOCHRDY signal that terminate the ISA bus cycle at the low voltage, thus elongating the lifetime of the bus cycle. Or alternatively, at the beginning of booting the computer, part of the BIOS data and address are latched into buffer memory and are read out later. This does not really suspend the bus cycle to perform the real-time inspection function.

SUMMARY OF THE INVENTION

For a normal PCI bus cycle, when the FRAME# signal changes from HIGH to LOW, it signals the start of a PCI bus cycle. At this moment, the one shown on the AD bus is the address that the PCI bus cycle wants to position while the one shown on the C/BE# bus is the command. Each device on the PCI bus cycle will perform decoding on the address and command to ensure that whether it is a target device of the PCI bus cycle. If so, then the DEVSEL# signal is sent out to notify the PCI host to perform subsequent data transmission actions. If the target device cannot successfully complete the read/write action, that is, it cannot respond the TRDY# signal, then it can send out a STOP# signal to notify the PCI host to retry one cycle.

The single step debug card for the PCI interface of the invention utilizes the above-mentioned retry function. After it latches the signals of the address, data, command and BE# of the PCI bus cycle that are subject to inspection and displays them through an LED, it forces the DEVSEL# signal to be at the low voltage in the next cycle so as to respond in advance the PCI bus cycle and to maintain the TRDY# signal at the high voltage, elongating this cycle. The signals of the previously latched address, data, command and BE# can thus be shown on the LED all the time for inspection through the single step debugging. Finally, a STOP# signal is sent out through a switch circuit to notify the PCI host to retry the cycle. When the STOP# signal finishes, the DEVSEL# signal is also raised to HIGH to notify the PCI host to finish the intercepted cycle. When the cycle performs a retry, the above steps are repeated in order to achieve the function of single step debugging.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
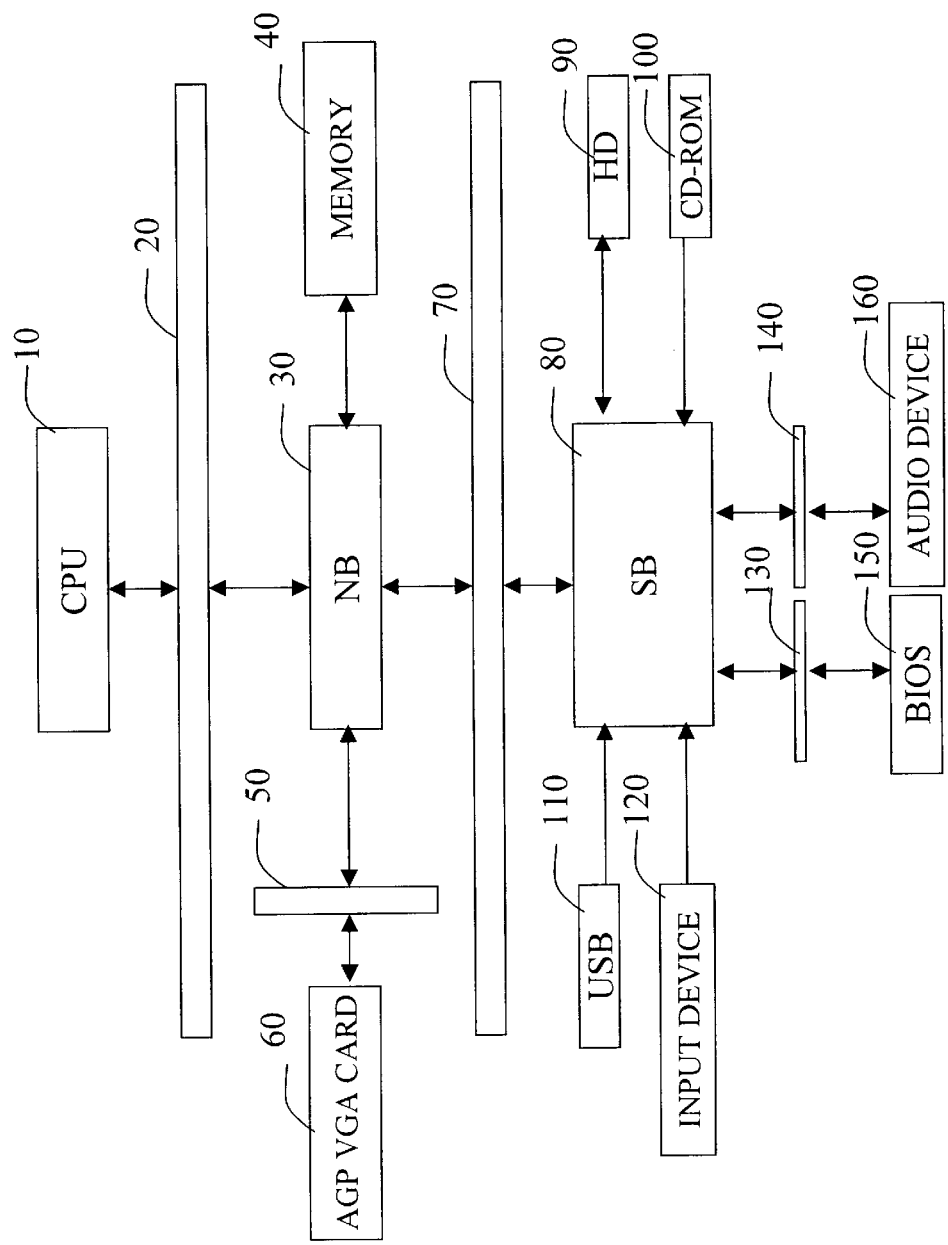
FIG. 1 is a structural block diagram of a conventional computer system.
Figure 2:
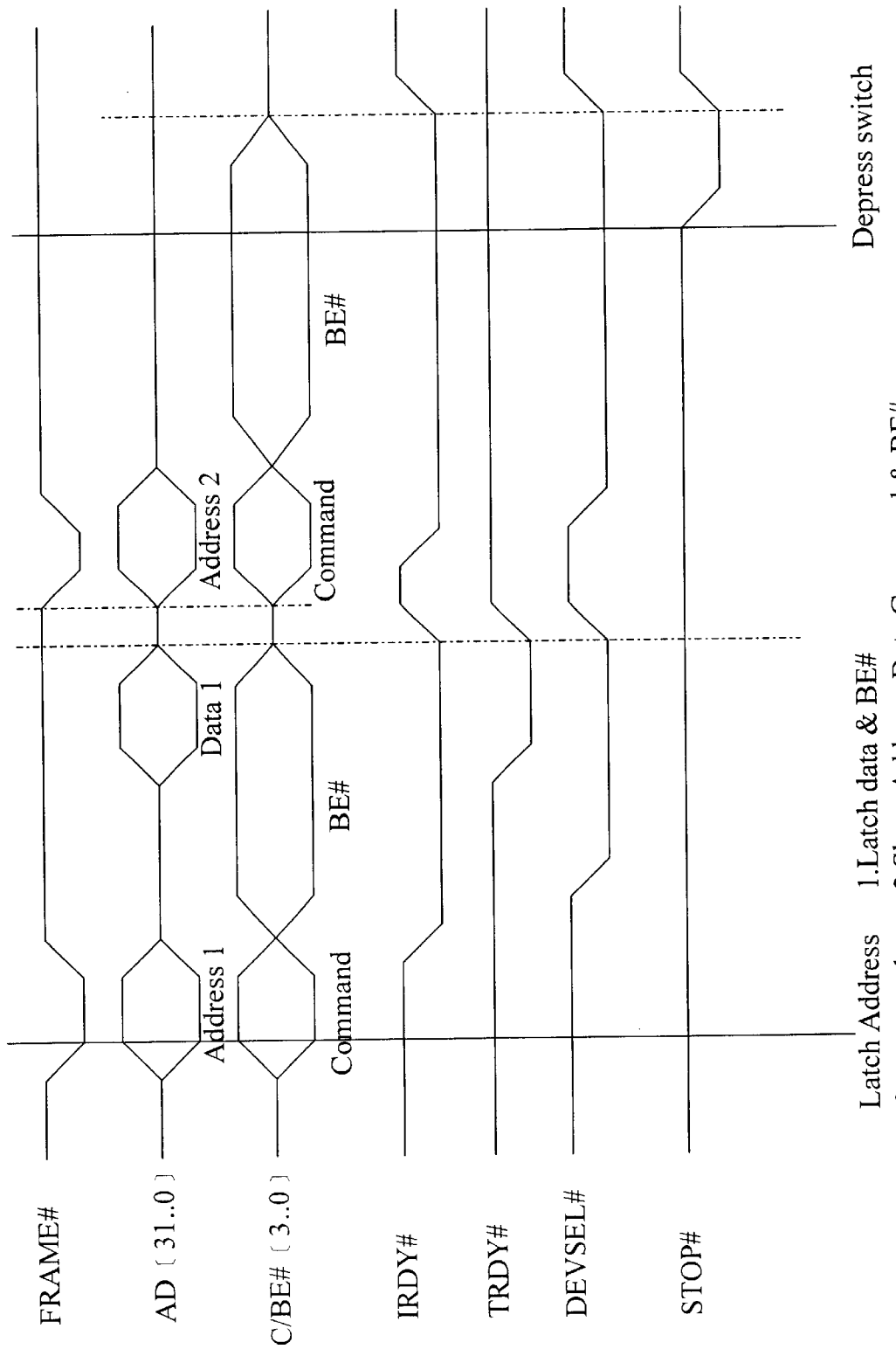
FIG. 2 is a time-ordered diagram of an embodiment of the invention that depicts the relation between the transmission frequencies of different buses and the sampling time orders generated according to the PCI bus transmission frequencies.

The time ordered diagram of an embodiment according to the invention is shown in FIG. 2, which depicts the relation between the transmission frequencies of different buses and the sampling time orders generated according to the PCI bus transmission frequencies. For a normal PCI bus cycle, when the FRAME# signal changes from HIGH to LOW, it signals the beginning of a PCI bus cycle. At this moment, the one shown on the AD bus is the address that the PCI bus cycle wants to position while the one shown on the C/BE# bus is the command. Each device on the PCI bus cycle will perform decoding on the address and command to ensure that whether it is a target device of the PCI bus cycle. If so, then the device selection signal DEVSEL# is set to keep at LOW as a response. When the data on the AD bus are effective ones and both the IRDY# ready signal and the TRDY# ready signal are both simultaneously at LOW, then it means that the PCI bus data are read/written. If the target device cannot successfully respond a TRDY# signal, then the PCI host provides a retry function, i.e., it sends out a STOP# signal, then the PCI host will retry the cycle according to the STOP# signal.

The single step debug card disclosed herein utilizes the above-mentioned retry function to latch the signal states such as the address and data of a normal ROM read cycle and to display them through an LED. It forces the DEVSEL# signal to be at low voltage in the next cycle so as to intercept the cycle. Since the TRDY# signal is kept at the high voltage by the single step debug card, this cycle will not be able to finish and the previously latched address, data, command and BE# are shown on the LED all the time. Finally, through a switch circuit, a STOP# signal is sent out to notify the PCI host to retry the cycle. The single step debug card raises the DEVSEL# signal so as to notify the PCI host to finish the cycle and to retry.

Figure 3:
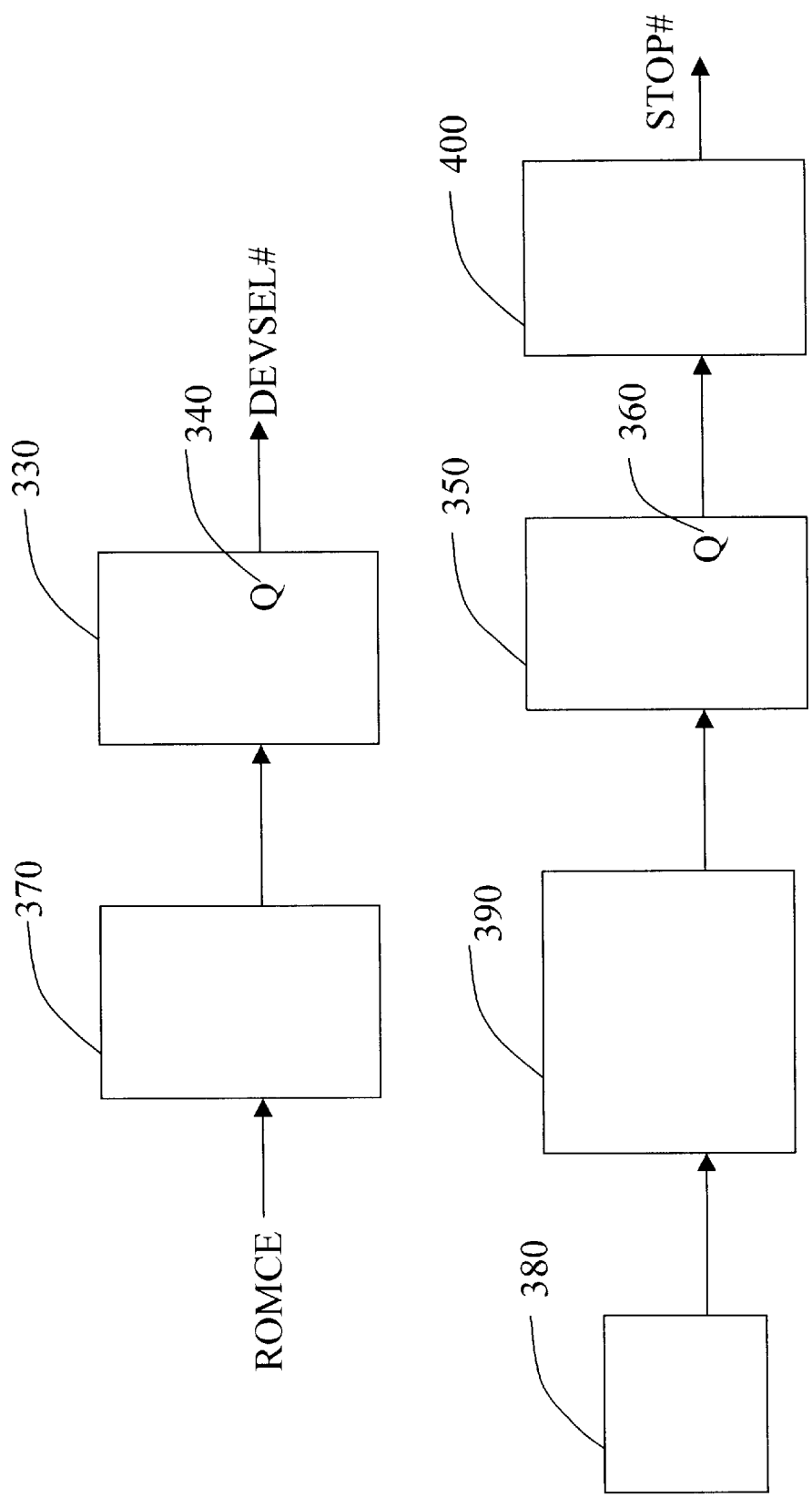
FIG. 3 is a signal flow chart of single step debugging in the embodiment of the invention.
Figure 3A:
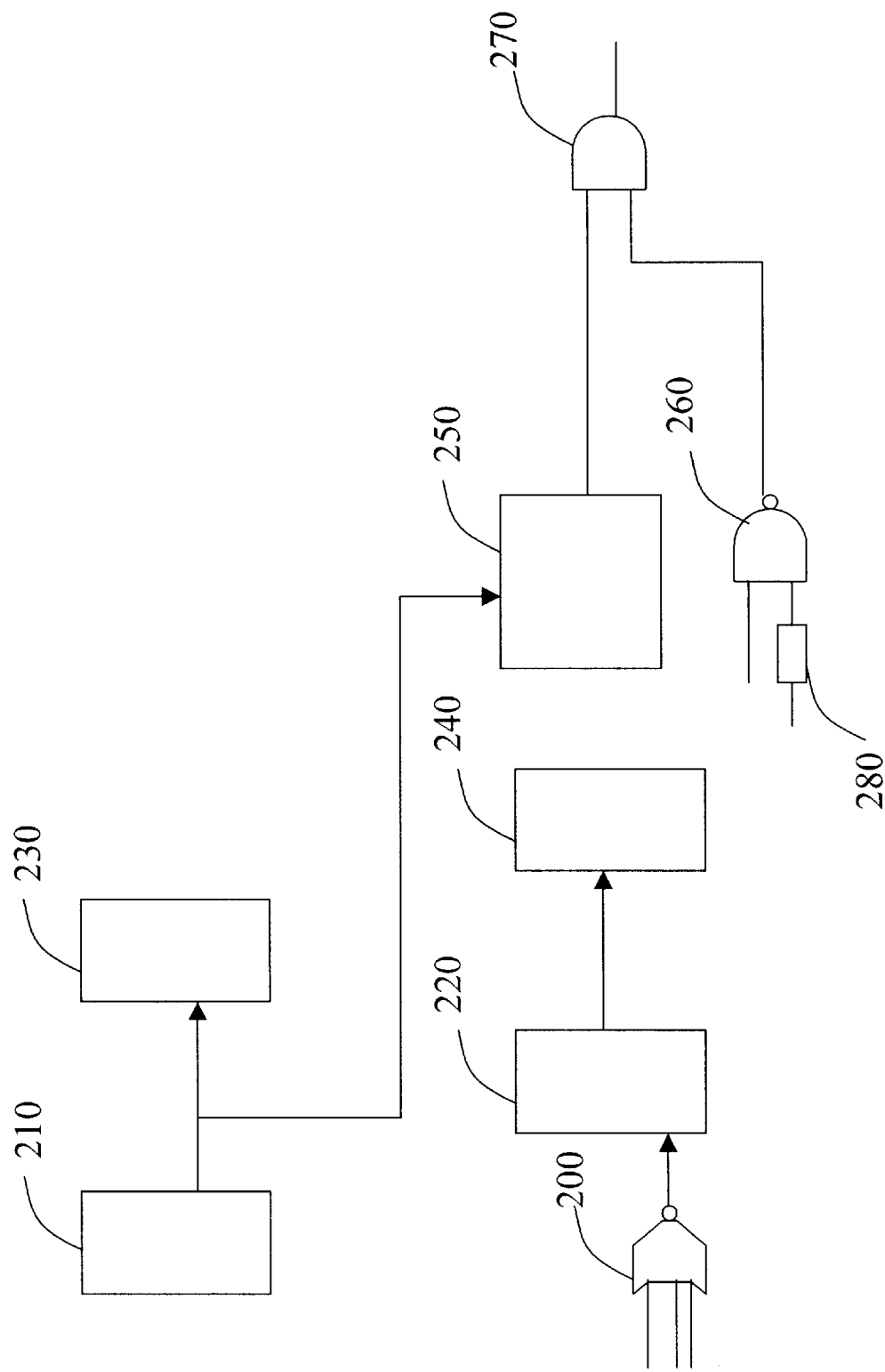
FIG. 3A is a schematic view of the latching and displaying the address and data according to the embodiment of the invention.

FIG. 3 is a signal flow chart of single step debugging in the embodiment of the invention. It is hereinafter explained along with FIG. 2:

When the FRAME# signal changes to low through a reverser 200, then a first latch 210 latches the address and a second latch 220 latches the data. The address and the data are shown on an address LED 230 and a data LED 240, respectively. The latched address is decoded 250 to ensure whether the address is the address of a ROM read cycle (as shown in FIG. 3A). When the IRDY# signal and the FRAME# signal are HIGH through an NAND gate 260, the decoded address passes through an AND gate 270 and the ROMCE# signal is maintained at HIGH for waiting the next cycle. It should be emphasized that when the FRAME# signal is HIGH, the IRDY# is not yet kept at LOW. At this moment, the rising edge of the PCI latch still has the FRAME# signal at LOW while IRDY# signal at HIGH. Therefore when the FRAME# signal is at HIGH and the IRDY# is kept at LOW, they do not occur at the rising edge of the PCI latch. To avoid generating an ineffective control signal, a delay device 280 has to be employed to delay the FRAME# signal.

Figure 3B:
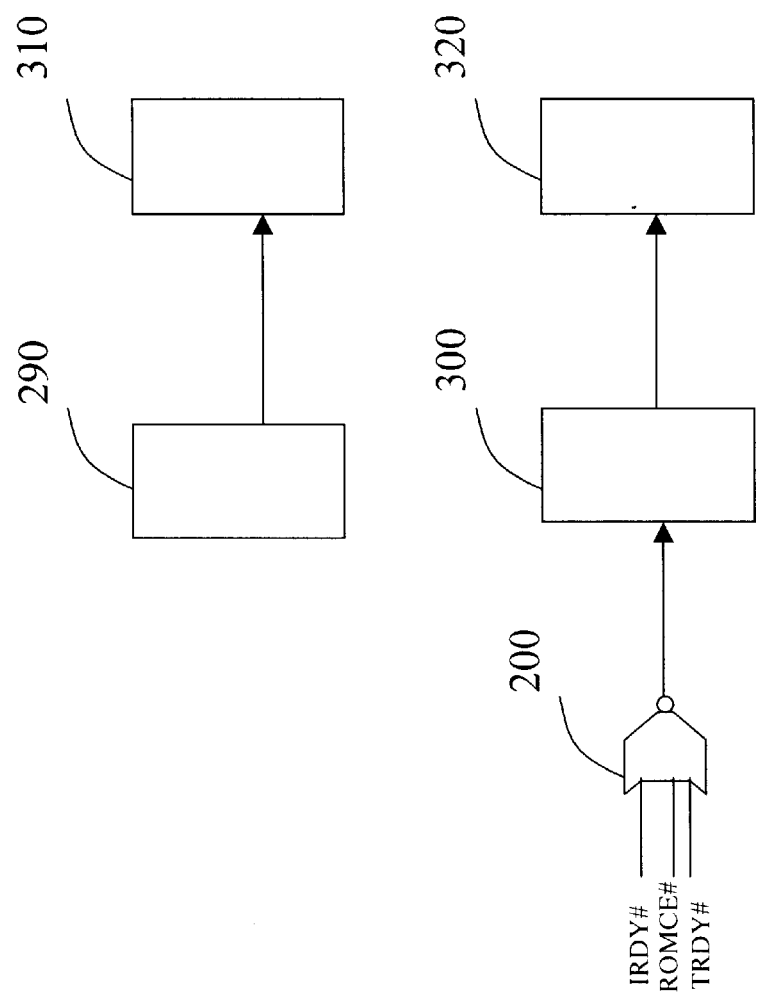
FIG. 3B is a schematic view of the latching and displaying the command and byte enable according to the embodiment of the invention.

When the IRDY# ready signal, the TRDY# signal and the ROM control signal (ROMCE#) simultaneously change to LOW through an NOR gate, a third latch 290 latches the command and a fourth latch 300 latches the BE# signal. The command and the BE# signal are displayed on a command LED 310 and a BE# LED 320 (FIG. 3B).

The following further describes the DEVSEL# signal control circuit that sends out a DEVSEL# signal from a target device and the switch through which a STOP# signal is sent out.

When the PCIRST# signal is at LOW or when the FRAME# signal and the IRDY# ready signal are both at HIGH, when the first setting output Q340 of a first D inverter 330 is preset to 1. When the bus cycle starts, the FRAME# signal is at LOW and the IRDY# ready signal is at HIGH, the second setting output Q360 of a second D inverter 250 is cleared to be 0 (CLR). At the moment, Q340 is 1, the DEVSEL# signal is closed; Q360 is 0 and the STOP# signal is also closed. The ROMCE# signal is taken as the input of the counter 370 and the terminal count (TC) is taken as the output of the counter 370. When the clock input (CLK) of the first D inverter 330 generates a rising edge, the width of the TC is determined by the cycle of the time-ordered input (which is equal to twice the rising edge of the ROMCE# signal). That is, when the second ROMCE# signal generates its rising edge, Q340 turns from 1 to 0, the counter 370 stops counting and the DEVSEL# signal is changed to LOW so as to intercept the cycle.

Through a switch circuit 380, a LOW to HIGH time pulse is generated by a de-bounce circuit 390. The second setting output Q360 of the second D inverter 350 changes from 0 to 1, enabling a monostable multivibrator 400 to generate a STOP# pulse to change the DEVSEL# signal to HIGH and to make the counter 370 count normally in order to wait the rising edge of the ROMCE# signal.

When the STOP# signal is generated, the IRDY# signal is changed to HIGH at the rising edge of the next PCI time pulse so as to close this cycle. The cycle is then retried to achieve the function of single step debugging.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A single step debugging method for a peripheral component interconnect (PCI) bus, which comprises the steps of:

keeping the FRAME# signal on the PCI bus at a low voltage;

latching the address and command of a PCI bus cycle;

displaying the address and the command of the PCI bus cycle;

simultaneously keeping the read only memory (ROM) control signal (ROMCE#) and the IRDY# ready signal and the TRDY# ready signal on the PCI bus at a low voltage;

latching the data and byte enable (BE#) of the PCI bus cycle;

displaying the data and the BE# of the PCI bus cycle;

waiting a device selection signal (DEVSEL#) to be sent out from a target device and keeping the IRDY# ready signal, the TRDY# signal and the device selection signal at a low voltage in order to intercept the PCI bus cycle; and providing a retry function by a PCI host when the target device is not able to respond the TRDY# signal before the PCI bus cycle ends.

2. The method according to claim 1, wherein the step of keeping the frame signal at a low voltage represents the beginning of the PCI bus cycle.

3. The method according to claim 1, wherein the retry function is to send out a STOP# signal from the target device and to retry the PCI bus cycle according to the STOP# signal.

4. The method according to claim 3, wherein the STOP# signal is generated by a switch circuit, a de-bounce circuit, a D inverter and a monostable multivibrator.

5. The method according to claim 1, wherein the step of latching the address of the PCI bus cycle further comprises the step of decoding the address so as to ensure that the address is the address of the ROM read cycle.

6. The method according to claim 1, wherein the step of displaying the address and the command of the PCI bus cycle is achieved through an address LED and a command LED, respectively.

7. The method according to claim 1, wherein the step of displaying the data and the byte enable of the PCI bus cycle is achieved through a data LED and a byte enable LED, respectively.

8. A single step debug card for a peripheral component interconnect (PCI) bus, which comprises:

a first latch for latching the address of a PCI bus cycle;

an address LED for displaying the address;

a second latch for latching the data of the PCI bus cycle;

a data LED for displaying the data;

a third latch for latching the command of the PCI bus cycle;

a command LED for displaying the command;

a fourth latch for latching the byte enable of the PCI bus cycle;

a byte enable LED for displaying the byte enable;

a device selection signal (DEVSEL#) control circuit comprising a counter and a first D inverter for controlling the device selection signal and intercepting the PCI bus cycle; and a switch circuit for generating a stop signal (STOP#) and retrying the PCI bus cycle accordingly.

9. The debug card according to claim 8, wherein the counter takes the read only memory control signal (ROMCE#) as its input and a terminal count (TC) as its output.

10. The debug card according to claim 8, wherein the switch circuit further comprises a de-bounce circuit, a D inverter and a mono stable multivibrator.

* * * * *